B. G. SOMERVILLE.
CREAM REMOVER.
APPLICATION FILED MAY 11, 1918.
1,288,725.
Patented Dec. 24, 1918.
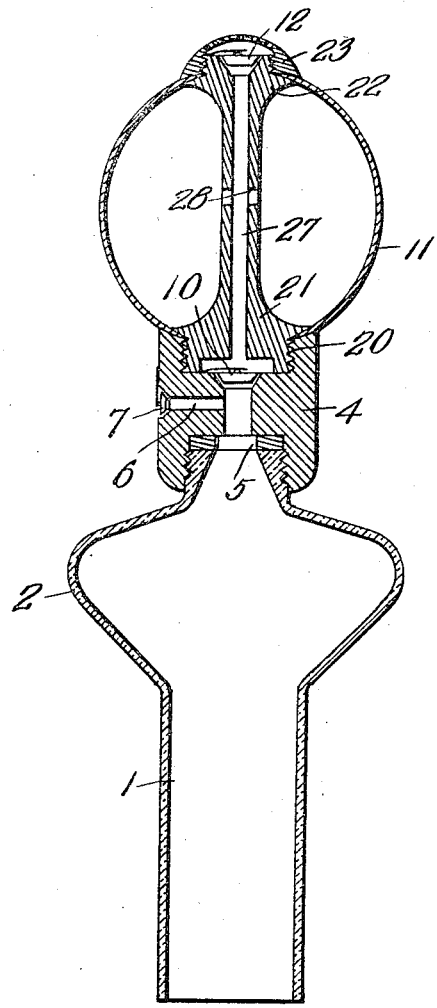
WITNESSES
James F. Crown,
N. Collamer
INVENTOR
Benjamin G. Somerville,
BY Richard Owen,
ATTORNEY

UNITED STATES PATENT OFFICE.

BENJAMIN G. SOMERVILLE, OF BRONX, NEW YORK.

CREAM-REMOVER.

1,288,725.   Specification of Letters Patent.   Patented Dec. 24, 1918.

Application filed May 11, 1918. Serial No. 233,912.

*To all whom it may concern:*

Be it known that I, BENJAMIN G. SOMERVILLE, a citizen of the United States, residing at Bronx, in the county of Bronx and State of New York, have invented certain new and useful Improvements in Cream-Removers, of which the following is a specification.

This invention relates to water distribution, and more especially to sampling tubes; and the object of the same is to produce a hand operated device for taking the cream off the top of the milk in an ordinary milk bottle or similar container.

A further object is to produce an extremely simple household article of this character, which is easy of use and can be manufactured at a cost which places it within the reach of all.

Details of construction are set forth in the following specification and claims, and reference is made to the drawing which gives a vertical section through one type of this invention.

A spout or nozzle 1 has an enlargement 2 in its body to increase its capacity, above which it is externally threaded to engage within a tubular shank 4, the engagement being rendered watertight by a washer or gasket 5. At the upper end of the bore through said shank is a downwardly closing inlet valve 10, and a lateral port 6 communicating with said bore opens out the side of the shank and is closed by a release valve 7 of any appropriate construction, but capable of being opened by the finger or the nail.

A rubber bulb 11 is secured to the top of the shank 4 and is of ample capacity, although its size should be such that it may be grasped in one hand of the operator.

The shank has a cavity in its upper end internally threaded as shown at 20 to receive the threaded lower end of a post 21 whose bore 27 alines with the bore of the shank above the inlet valve 10. The base of the post may be enlarged and screwed into the recess or cavity, and this form of attachment may be employed for clamping the bulb 11 in place. The upper end of the post may also be enlarged as shown at 22 and a guard 23 screwed thereon, and this form of attachment may be employed for clamping the upper end of the bulb in place. An outlet valve 12 is mounted in the upper end of the post, which end is externally threaded, and the perforated guard 23 overlies this valve. The bore of the post has a transverse port 28 communicating with the interior of the bulb. Such is the construction of the type of my invention shown in the drawings.

To remove the cream from the milk in an ordinary milk bottle, for instance, the lower end of the spout is inserted therein and is pushed down into but not completely through the cream. Now the operator manipulates the bulb 11 by first compressing the same, and then releasing pressure. Compression causes the air within the bulb to be driven out the outlet valve 12 at the top, and release of pressure permits the expansion of the bulb when the vacuum therein draws air in through the inlet valve 10 at the bottom, and of course tends to create a vacuum within the spout and its enlargement 2. This sucks the cream up into the spout, which as shown in the drawings, should be of glass so that the action of the device may be observed. This operation is continued, and the pumping result arising therefrom draws the cream off the milk in the bottle or other container, until the cream rises into the spout and perhaps fills its enlargement 2. It may then be carried to any appropriate point and the release valve 7 opened by the finger or finger nail of the operator. This admits air to the bore of the shank 4, and permits the cream accumulated within the spout to run out. The entire device can be washed by immersing it in warm water, and it should be kept handy in the kitchen or dairy for use by the housewife or maid.

The foregoing description and the drawings have reference to what may be considered the preferred or approved form of my invention. It is to be understood that I may make such changes in construction and arrangement and combination of parts, materials, dimensions, et cetera, as may prove expedient and fall within the scope of the appended claims.

While I have described the device as used for removing cream, it is quite obvious that it could be employed for other purposes where a lighter liquid is to be taken off the surface of a heavier liquid with which it will not mix. Also I reserve the right to use the device for any other purpose for which it is capable.

Having thus fully described my invention, what I claim as new and desire to secure by Letters Patent, is:—

1. In a cream remover, the combination with a spout, a tubular shank connected with the upper end of the spout, and manually operable means for opening the bore of said shank to the outside air; of a tubular post having its lower end detachably connected with the shank and its upper end externally threaded, a perforated guard screwed onto said threads, a bulb whose upper end is clamped under the guard and whose lower end is connected with said shank, the post having a transverse port putting its bore into communication with the interior of the bulb, and upwardly opening valves within said shank and within the guard.

2. In a cream remover, the combination with a spout, a tubular shank connected with the upper end of the spout and having a recess in its upper end, and manually operable means for opening the bore of said shank to the outside air, of a tubular post having an enlargement at its lower end threaded into said recess and an enlargement at its upper end externally threaded, a perforated guard screwed onto the last-named threads, a bulb whose upper end is clamped under the guard and whose lower end is clamped against said shank, the post having a transverse port intersecting its bore and communicating with the interior of said bulb, an upwardly opening inlet valve within said shank, and an upwardly opening outlet valve within said guard.

In testimony whereof I affix my signature in presence of two witnesses.

BENJAMIN G. SOMERVILLE.

Witnesses:
EDWARD HARRIS,
PRIVATE EDGAR STEINHARDT.

Copies of this patent may be obtained for five cents each, by addressing the "Commissioner of Patents, Washington, D. C."